United States Patent [19]

Moir

[11] Patent Number: 5,136,450
[45] Date of Patent: Aug. 4, 1992

[54] DISC PACK ASSEMBLY HAVING A LAMINATE SLEEVE DISPOSED BETWEEN A SPINDLE AND A DISC, FOR REDUCING RADIAL DISC DISPLACEMENT

[75] Inventor: Michael B. Moir, Newbury Park, Calif.

[73] Assignee: Seagate Technology, Inc., Scotts Valley, Calif.

[21] Appl. No.: 639,791

[22] Filed: Jan. 10, 1991

[51] Int. Cl.$^5$ ............... G11B 17/038; G11B 17/022; G11B 5/82
[52] U.S. Cl. .................... 360/135; 360/97.03; 360/98.08; 360/99.12
[58] Field of Search ............. 360/135, 133, 97.03, 360/98.08, 99.08–99.12; 369/270

[56] References Cited

U.S. PATENT DOCUMENTS 4,754,351 6/1988 Wright .................................. 360/97
4,764,828 8/1988 Gollbach ............................. 360/135

OTHER PUBLICATIONS

Product Brochure from ScotchMark Identification Systems for "Scotch" Brand #300 Laminating Adhesives Systems; dated Jan. 1979.
Product Brochure from Flourglas for a Unsintered PTFE Teflon Tape.
Product Brochure from Fralock for Kapton Polyimide Film.

*Primary Examiner*—Robert S. Tupper
*Attorney, Agent, or Firm*—Kelly, Bauersfeld & Lowry

[57] ABSTRACT

A disc pack assembly utilized in a Winchester hard disc drive includes a rotatable cylindrical spindle and at least one disc mounted on the spindle for rotation therewith. A laminate sleeve surrounds the outer diameter of the spindle and is disposed between the inner diameter of the disc and the outer diameter of the spindle. The sleeve includes a first layer of a relatively pliable material disposed immediately adjacent to the spindle outer surface, and a second layer of a relatively firm material secured to and generally surrounding the first layer. The sleeve forms a substantially uniform and continuous magnetic-flux insulating gap between the inner diameter of the disc and the outer diameter of the spindle to provide clearance between the disc and the spindle and prevent the inner diameter of the disc from abutting the outer diameter of the spindle due to thermally induced differential expansion of the disc and the spindle.

15 Claims, 1 Drawing Sheet ced between the disc and the spindle to prevent the inner diameter of the disc from abutting the outer diameter of the spindle due to thermally induced differential expansion. Further, a disc pack assembly is needed which is readily adapted to customary disc drive assembly procedures, and which minimizes assembly time and attendant costs. Further, such a disc pack assembly is needed which does not negatively affect the operating characteristics or performance of the disc drive in which it is incorporated. The present invention fulfills these needs and provides other related advantages.

DISC PACK ASSEMBLY HAVING A LAMINATE SLEEVE DISPOSED BETWEEN A SPINDLE AND A DISC, FOR REDUCING RADIAL DISC DISPLACEMENT

BACKGROUND OF THE INVENTION

This invention relates generally to computer hard disc drive systems. More specifically, the present invention relates to a disc pack assembly utilized in Winchester disc drive systems, having a laminate sleeve disposed between a rotatable spindle and at least one disc mounted on the spindle for reducing radial disc displacement.

As demands for increased storage capacity, reduced size and high access speed have grown, manufactures have made various improvements in Winchester disc drives to meet those demands. For example, manufactures have increased the number of tracks per inch on the disc to increase storage density. As track densities increase, however, the dimensional stability of the disc-spindle assembly and acceptable tolerances for radial disc movement become critical, and high mechanical precision is required during assembly.

In prior art disc drives, the discs are mounted over a spindle such that the internal diameter of each disc fits around the external diameter of the spindle. The spindle is typically ferrous so that it will carry the magnetic flux of the integral motor field magnets. The discs and disc spacers, on the other hand, are typically aluminum. Because of this difference in materials the dimensional relationship between the outer diameter of the spindle and the inner diameter of the discs does not remain constant. Specifically, when the disc drive is subjected to temperatures below that at which the components were stabilized at during assembly, everything begins to contract. The aluminum discs and spacers contract at a rate greater than twice that of the steel spindle.

If, due to thermal expansion and contraction of the components of the disc pack assembly, the discs move radially with respect to the spindle, excessive error may be introduced during operation of the disc drive due to track eccentricity. Write operations must be performed with the read/write head directly on the center line of the track. When discs are displaced radially from their thermally stabilized position, however, a track written under stabilized temperature conditions will be shifted off-center if it is later read under a different condition.

For example, assembly of the disc pack assembly for a disc drive is accomplished at approximately 22° C. After servo data is written onto the servo disc surface, the disc drive assembly is subjected to a thermal stabilization cycle down to −40.20 C. and up to 70° C. In a typical aluminum data disc, the inner edged will contract 800 microinches, but a typical stainless steel spindle hub will only contract 300 microinches. If an aluminum data disc was touching the steel hub at the time of assembly, the tracks on that disc would be shifted approximately 250 microinches from their original position.

Accordingly, there has been a need for a novel disc pack assembly for use in Winchester disc storage devices, constructed to reduce or eliminate radial disc displacement relative to the spindle hub. Such a novel disc pack assembly is needed which forms a substantially uniform and continuous magnetic-flux insulating gap between the inner diameter of the disc and the outer diameter of the spindle, which gap provides clearance

SUMMARY OF THE INVENTION

The present invention resides in a improved disc pack assembly for use in Winchester-type hard disc drives. The disc pack assembly comprises a rotatable cylindrical spindle, at least one disc mounted on the spindle for rotation therewith, and a resilient sleeve generally surrounding the outer diameter of the spindle and disposed between the inner diameter of the disc and the outer diameter of the spindle. The sleeve provides means for reducing radial disc displacement relative to the spindle, induced by differential thermal expansion of the disc and spindle.

In a preferred form of the invention, the rotatable spindle has an outer cylindrical surface about which the sleeve is placed. The sleeve is of laminate construction and includes a first layer of a relatively pliable material disposed immediately adjacent to the spindle outer surface, and a second layer of a relatively firm material secured to and generally surrounding the first layer.

The second layer preferably comprises a polymide film such as KAPTON having a nominal thickness of approximately 0.002 inches. The first layer comprises an unsintered polytetrafluoroethylene material such as TEFLON having a nominal thickness of approximately 0.003 inches. A third sleeve layer is disposed between the first and second layers to provide means for adhesively securing the first and second layers to one another. The third layer preferably has a nominal thickness of approximately 0.001 inches.

The sleeve forms a substantially uniform and continuous magnetic-flux insulating gap between the inner diameter of the disc and the outer diameter of the spindle. This gap provides clearance between the disc and the spindle to prevent the inner diameter of the disc from abutting the outer diameter of the spindle due to thermally induced differential expansion of the disc and the spindle. The second layer is relatively firm to facilitate placement of the disc about the spindle without destroying the sleeve. The first layer is relatively pliable and will flow when squeezed to prevent shifting of the disc relative to the spindle.

Other features and advantages of the present invention will become apparent from the following more detailed description, taken in conjunction with the accompanying drawings which illustrate, by way of example, the principles of the invention.

BRIEF DESCRIPTION OF THE DRAWINGS

The accompanying drawings illustrate the invention. In such drawings.

DETAILED DESCRIPTION OF THE PREFERRED EMBODIMENT

Figure 1:
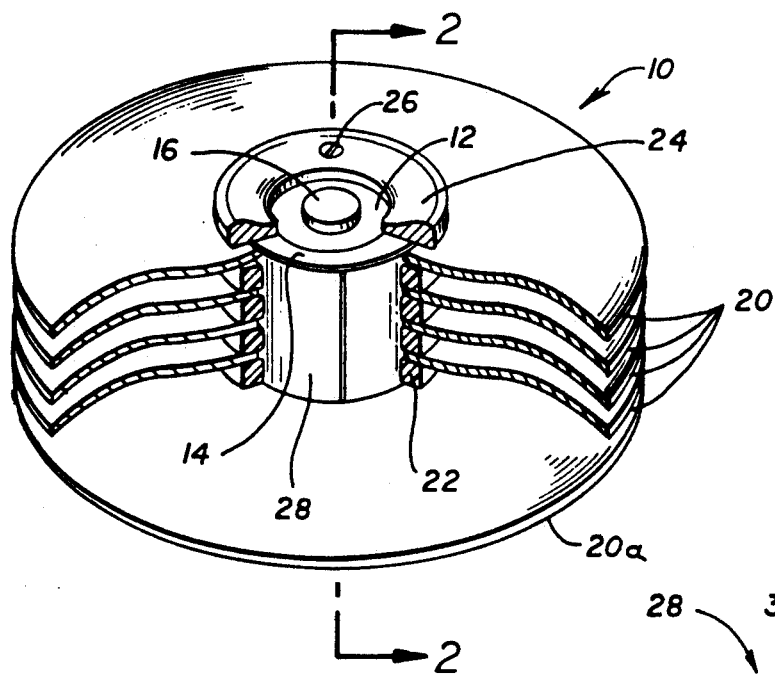
FIG. 1 is a partially sectional top and front perspective view of a disc pack assembly embodying the invention, illustrating disposition of a laminate sleeve surrounding a spindle outer surface between the spindle and the inner diameter of a plurality of stacked discs.

As shown in the drawings for purposes of illustration, the present invention is concerned with an improved disc pack assembly, generally designated in the accompanying drawings by the reference number 10. As will be set forth below, the disc pack assembly 10 of the present invention significantly reduces radial disc displacement caused by thermally induced differential expansion between components of the disc pack assembly.

Figure 3:
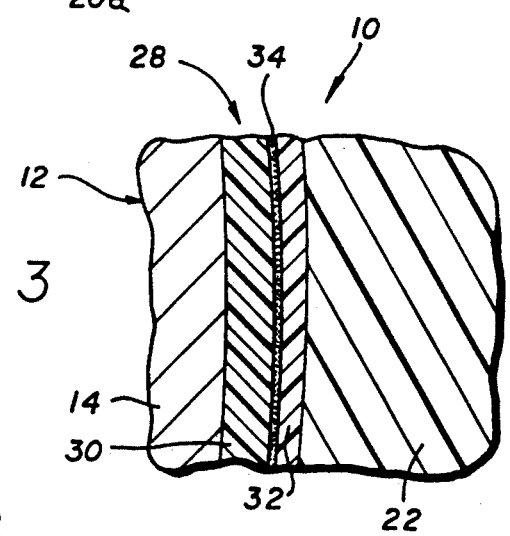
FIG. 3 is an enlarged fragmented sectional view taken generally along the line 3—3 of FIG. 2, illustrating the laminate construction of the sleeve disposed between the spindle hub and the inner diameter of the discs.
Figure 2:
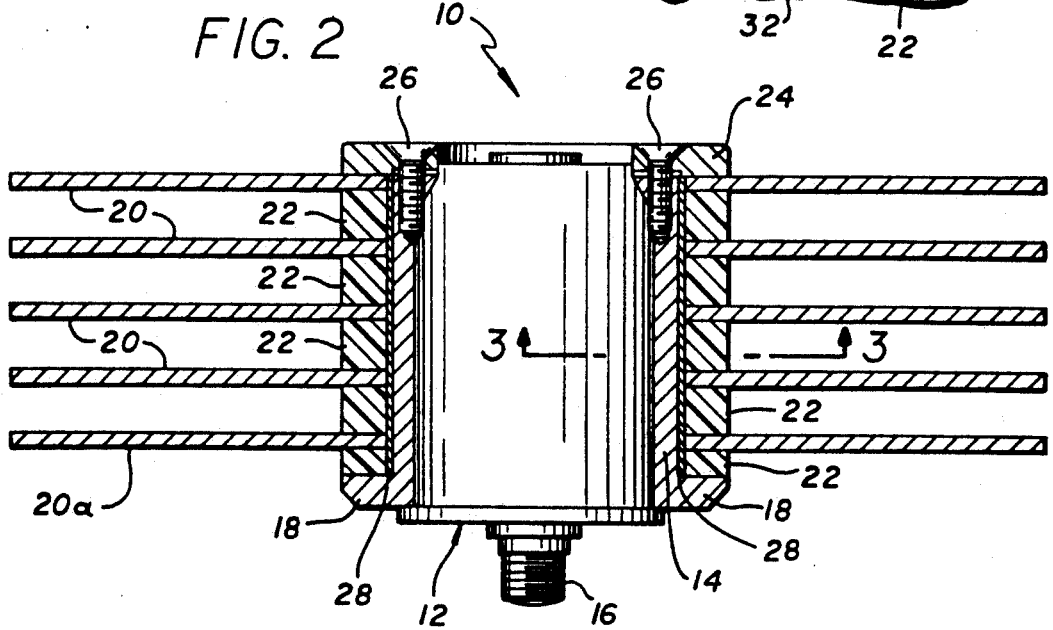
FIG. 2 is an enlarged, partially sectional view taken generally along the line 2—2 of FIG. 1.

In accordance with the present invention, and as illustrated with respect to a preferred embodiment in FIGS. 1 through 3, the disc pack assembly 10 comprises a rotatable spindle 12 which has a generally cylindrical hub 14 forming an outer cylindrical surface thereof. The hub 14 is preferably formed of steel or another ferrous material capable of carrying the magnetic flux of internal motor field magnets. The spindle 12 is caused to rotate about a shaft 16 by means well known in the art. An integral peripheral flange 18 is formed on the bottom of the hub 14, to support a plurality of discs 20 about the spindle 12.

An annular spacer 22 rests directly over the peripheral flange 18, and a lower most disc 20a, typically the servo disc, is supported atop the annular spacer 22. Other discs 20 are spaced above the lowermost disc 20a and are separated by additional annular spacers 22. The substrates of the discs 20 and the annular spacers 22 are commonly of aluminum. A spindle cap 24 is secured in place with screws 26 and abuts the uppermost disc at its inner peripheral upper surface. Thus, the disc stack is retained securely in place by being effectively clamped between the integral peripheral flange 18 and the spindle cap 24.

As the hub 14 rotates with the spindle 12, the discs 20 rotate therewith. To accommodate the different coefficients of expansion of the aluminum discs 20 and the steel spindle 12 and hub 14, a slight gap is provided between the inner edge of the discs 20 and the outer diameter of the hub 14.

The disc pack assembly 10 has typical operating parameters which permit use within a temperature range of 4° C. to 50° C. The difference between the coefficient of expansion of the aluminum and steel is approximately 5 microinches per inch per degree Fahrenheit. Thus, the discs expand and contract at a greater rate than the hub. In the past this has been a source of radial disc displacement and disc track eccentricities.

In order to reduce radial disc displacement relative to the spindle 12, a laminate shim or sleeve 28 generally surrounds the outer diameter of the hub 14 and is disposed between the inner diameter of the discs 20 and the outer diameter of the hub 14. The sleeve 28 includes a first layer 30 of a relatively pliable material disposed immediately adjacent to the outer surface of the hub 14. The sleeve also includes a second layer 32 of a relatively firm material secured to and generally surrounding the first layer 30.

The sleeve 28 forms a substantially uniform and continuous magnetic-flux insulating gap between the inner diameter of the discs 20 and the outer diameter of the hub 14. This gap provides clearance between the discs 20 and the spindle 12 to prevent the inner diameter of the discs from the abutting the outer diameter of the spindle, and specifically the outer diameter of the hub 14, due to thermally induced differential expansion of the aluminum discs and the steel spindle and hub. Means for adhesively securing the first layer 30 to the second layer 32 are provided by a third layer 34 disposed between the first and second layers.

The second outwardly facing layer 32 of the laminate sleeve 28 is preferably relatively firm to facilitate placement of the discs 20 about the spindle 12 without destroying the sleeve. The first and third layers 30 and 34 of the laminate sleeve are each relatively pliable and flow when squeezed to prevent shifting of the discs 20 relatively to the spindle 12. More particularly, the second layer comprises a polymide film such as KAPTON having a nominal thickness of approximately 0.002 inches. KAPTON polymide film is manufactured by Dupont. The first layer preferably comprises an unsintered polytetrafluoroethylene material such as TEFLON having a nominal thickness of approximately 0.003 inches. The adhesive third sleeve layer 34 preferably has a nominal thickness of approximately 0.001 inches and may be of any suitable material possessing qualities and properties similar to the first layer 30. An exemplary suitable adhesive is the SCOTCH brand #300 laminating adhesive, product number Y-9458, manufactured by 3M.

From the foregoing it is to be appreciated that by utilizing the present invention a continuous clearance is maintained between the discs 20 and the spindle 12 so that there are no uneven radial forces introduced during differential expansion of portions of the disc pack assembly 10, and therefore no radial shift occurs. The laminate sleeve 28 can be applied in one simple operation to the exterior of the hub 14 so as to substantially surround the spindle 12, and remains in place as the discs 20 and annular spacers 22 are positioned about the spindle 12. The laminate construction of the sleeve 28 permits the sleeve to exhibit optimal characteristics for assembly and operation of the disc pack assembly 10. While the inner first and third layers are relatively pliable and permit differences in thermal expansion between the aluminum discs 20 and the steel spindle 12 and hub 14, the outer second layer has sufficient firmness such that incidental contact between the discs 20 and the annular spacers 22, and the sleeve 28 during assembly of the disc pack assembly 10 will not degrade or destroy the sleeve 28.

Although a particular embodiment of the invention has been described in detail for purposes of illustration, various modifications may be made without departing from the spirit and scope of the invention. Accordingly, the invention is not to be limited, except as by the appended claims.

I claim:

1. A disc pack assembly for reducing radial disc replacement, comprising:
   a rotatable, cylindrical spindle;
   at least one disc mounted on the spindle for rotation therewith; and
   a resilient sleeve generally surrounding the outer diameter of the spindle and disposed between the inner diameter of the at least one disc and the outer diameter of the spindle, the sleeve forming a substantially uniform and continuous magnetic-flux insulating gap between the inner diameter of the disc and the outer diameter of the spindle, the gap providing clearance between the disc and the spindle to prevent the inner diameter of the spindle due to thermally induced differential expansion of the disc and the spindle, wherein the sleeve comprises a laminate structure including a first layer disposed adjacent to the spindle and a second layer disposed adjacent to the disc, wherein the second layer is relatively firm to facilitate placement of the disc about the spindle without destroying the sleeve, and wherein the first layer is relatively pliable and will flow when squeezed to prevent shifting of the disc relative to the spindle.

2. A disc pack assembly as set forth in claim 1, wherein the second layer comprises a polymide film material such as KAPTON.

3. A disc pack assembly as set forth in claim 2, wherein the second layer has a nominal thickness of approximately 0.002 inches.

4. A disc pack assembly as set forth in claim 1, wherein the first layer comprises a polytetrafluoroethylene material such as TEFLON.

5. A disc pack assembly as set forth in claim 4, wherein the first layer comprises an unsintered TEFLON material.

6. A disc pack assembly as set forth in claim 4, wherein the first layer has a nominal thickness of approximately 0.003 inches.

7. A disc pack assembly as set forth in claim 1, including means for adhesively securing the second layer to the first layer.

8. A disc pack assembly as set forth in claim 7, wherein the means for adhesively securing the second layer to the first layer comprises a third sleeve layer disposed between the second and first layers.

9. A disc pack assembly as set forth in claim 10, wherein the third layer has a nominal thickness of approximately 0.001 inches.

10. A disc pack assembly for reducing radial disc displacement, comprising:
 a rotatable spindle having an outer cylindrical surface;
 a laminate sleeve generally surrounding the spindle outer surface, the sleeve including a first layer of a relatively pliable material disposed immediately adjacent to the spindle outer surface, and a second layer of a relatively firm material secured to and generally surrounding the first layer; and
 at least one disc mounted on the spindle for rotation therewith, the laminate sleeve being disposed between the inner diameter of the at least one disc and the outer diameter of the spindle, the sleeve forming a substantially uniform and continuous magnetic-flux insulating gap between the inner diameter of the disc and the outer diameter of the spindle, the gap providing clearance between the disk and the spindle to prevent the inner diameter of the disk from abutting the outer diameter of the spindle due to thermally induced differential expansion of the disc and the spindle, wherein the second layer has sufficient firmness to facilitate placement of the disc about the spindle without destroying the sleeve, and wherein the first layer sufficient pliability to flow when squeezed to prevent shifting of the disc relative to the spindle.

11. A disc pack assembly as set forth in claim 10, wherein the laminate sleeve includes a third layer disposed between the first and second layers for adhesively securing the first layer to the second layer.

12. A disc pack assembly as set forth in claim 11, wherein the third layer has a nominal thickness of approximately 0.001 inches.

13. A disc pack assembly as set forth in claim 10, wherein the second layer comprises a polymide film material such as KAPTON, having a nominal thickness of approximately 0.002 inches.

14. A disc pack assembly as set forth in claim 10, wherein the first layer comprises an unsintered polytetrafluoroethylene material such as TEFLON having a nominal thickness of approximately 0.003 inches.

15. A disc pack assembly for reducing radial disc displacement, comprising:
 a rotatable spindle having an outer cylindrical surface;
 a laminate sleeve generally surrounding the spindle outer surface, the sleeve including a first layer of a relatively pliable unsintered polytetrafluoroethylene material such as TEFLON having a nominal thickness of approximately 0.003 inches disposed immediately adjacent to the spindle outer surface, a second layer of a relatively firm polymide film material such as KAPTON having a nominal thickness of approximately 0.002 inches generally surrounding the first layer, and a third relatively pliable layer disposed between the first and second layers for adhesively securing the first layer to the second layer, the third layer having a nominal thickness of approximately 0.001 inches; and
 at least one disc mounted on the spindle for rotation therewith, the laminate sleeve being disposed between the inner diameter of the at least one disc and the outer diameter of the spindle to form a substantially uniform and continuous magnetic-flux insulating gap between the inner diameter of the disc and the outer diameter of the spindle, the gap providing clearance between the disc and the spindle to prevent the inner diameter of the disc from abutting the outer diameter of the spindle due to thermally induced differential expansion of the disc and the spindle, wherein the second layer is sufficiently firm to facilitate placement of the disc about the spindle without destroying the laminate sleeve, and wherein the first and third layers are relatively pliable and will flow when squeezed to prevent shifting of the disc relative to the spindle.

* * * * *

UNITED STATES PATENT AND TRADEMARK OFFICE
CERTIFICATE OF CORRECTION

PATENT NO. : 5,136,450
DATED : August 4, 1992
INVENTOR(S) : Michael B. Moir

It is certified that error appears in the above-identified patent and that said Letters Patent is hereby corrected as shown below:

In column 1, line 53, delete "-40.20" and insert therefor ---$40°$---.

In column 5, line 39, delete "10" and insert therefor --8--.

In column 6, lne 6, after "layer" insert --has--.

Signed and Sealed this

Twelfth Day of October, 1993

Attest:

BRUCE LEHMAN

*Attesting Officer*     *Commissioner of Patents and Trademarks*